(12) United States Patent
Ghiron et al.

(10) Patent No.: US 7,013,067 B2
(45) Date of Patent: Mar. 14, 2006

(54) SILICON NANOTAPER COUPLERS AND MODE-MATCHING DEVICES

(75) Inventors: Margaret Ghiron, Allentown, PA (US); Prakash Gothoskar, Allentown, PA (US); Robert Keith Montgomery, Easton, PA (US); Vipulkumar Patel, Breinigsville, PA (US); Soham Pathak, Allentown, PA (US); Kalpendu Shastri, Orefield, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 11/054,205

(22) Filed: Feb. 9, 2005

(65) Prior Publication Data

US 2005/0201683 A1    Sep. 15, 2005

Related U.S. Application Data

(60) Provisional application No. 60/543,613, filed on Feb. 11, 2004.

(51) Int. Cl.
*G02B 6/26*    (2006.01)
(52) U.S. Cl. .......................................... 385/39; 385/43
(58) Field of Classification Search ................ 385/33, 385/36, 37, 39, 43, 50, 129–132, 14
See application file for complete search history.

(56) References Cited

U.S. PATENT DOCUMENTS

| | | | |
|---|---|---|---|
| 6,428,939 B1 * | 8/2002 | Yang et al. | 430/5 |
| 6,904,187 B1 * | 6/2005 | Fischer et al. | 385/5 |
| 2003/0039430 A1 * | 2/2003 | Deliwala | 385/14 |
| 2003/0044118 A1 * | 3/2003 | Zhou et al. | 385/43 |
| 2004/0057667 A1 | 3/2004 | Yamada et al. | |
| 2004/0071403 A1 | 4/2004 | Lipson et al. | |
| 2004/0207016 A1 | 10/2004 | Patel et al. | |
| 2004/0240782 A1 | 12/2004 | de Almeida et al. | |
| 2004/0244677 A1 | 12/2004 | Takami | |

* cited by examiner

*Primary Examiner*—Sarah Song

(57) ABSTRACT

An arrangement for coupling between a free-space propagating optical signal and an ultrathin silicon waveguide formed in an upper silicon layer (SOI layer) of a silicon-an-insulator (SOI) structure includes a silicon nanotaper structure formed in the (SOI layer) and coupled to the ultrathin silicon waveguide. A dielectric waveguide coupling layer is disposed so as to overly a portion of a dielectric insulating layer in a region where an associated portion of the SOI layer has been removed. An end portion of the dielectric waveguide coupling layer is disposed to overlap an end section of the silicon nanotaper to form a mode conversion region between the free-space signal and the ultrathin silicon waveguide. A free-space optical coupling arrangement is disposed over the dielectric waveguide coupling layer and used to couple between free space and the dielectric waveguide coupling layer and thereafter into the ultrathin silicon waveguide.

12 Claims, 7 Drawing Sheets

SILICON NANOTAPER COUPLERS AND MODE-MATCHING DEVICES

CROSS-REFERENCE TO RELATED APPLICATION

This application claims the benefit of Provisional Application No. 60/543,613, filed Feb. 11, 2004.

TECHNICAL FIELD

The present invention relates to silicon-based nanotaper couplers and, more particularly, to nanotaper couplers that may be utilized in conjunction with free-space optical couplers to facilitate the coupling of optical signals into and out of ultrathin, single-mode silicon waveguides.

BACKGROUND OF THE INVENTION

A "nanotaper", or "inverse taper", is generally defined as a terminating portion of a core of a high-contrast index waveguide that is used to facilitate efficient coupling between a single-mode optical fiber (for example) and an ultrathin, single-mode high-contrast index optical waveguide. For the purposes of the present invention, an "ultrathin" waveguide is defined as having a typical width on the order of approximately 0.5 $\mu$m and a typical thickness on the order of approximately 0.25 $\mu$m. In a typical device construction, the lateral dimension of the portion of the nanotaper proximate to the core of the high-contrast index waveguide approximately matches the width of the core. The lateral dimension of the nanotaper decreases monotonically along the direction of light propagation until it reaches a small value associated with a "tip" (i.e., that portion of the nanotaper distal from the core of the high-contrast index waveguide). The tip portion represents the point at which light first enters the high-contrast index waveguide for an "entry" nanotaper, or the point at which light first exits the high-contrast index waveguide for an "exit" nanotaper.

In some prior art nanotapers, the device is cleaved such that the tip position essentially coincides with a cleaved edge. Light is then launched directly into the tip of an entry nanotaper, or extracted directly from the tip of an exit nanotaper. Alternatively, in other prior art nanotapers, the position of the tip is located inside the device, away from the cleaved edge; an auxiliary waveguide is then used to transmit light from the cleaved edge to the tip of the nanotaper. The auxiliary waveguide generally comprises larger dimensions and a lower refractive index than the ultrathin waveguide, so that maximum coupling efficiency into the optical fiber is achieved since the mode size and numerical aperture of the auxiliary waveguide are much closer to the fiber parameters than the ultrathin waveguide parameters. The core of the auxiliary waveguide may comprise a polymer-based material with a refractive index on the order of 1.5–1.6. Other materials, such as silicon oyxnitride, doped silicon dioxide, etc. may be used to form the core region of the auxiliary waveguide.

In particular, a prior art nanotaper coupler usually comprises a pair of waveguide sections. A first, larger-dimensioned waveguide section is generally disposed with respect to a second, smaller-dimensioned waveguide section such that a portion of the first section overlaps a portion of the second section, forming a "mode conversion region". One exemplary overlap geometry is disclosed in U.S. Patent Publication 2004/0057667, where FIGS. 1 and 2 illustrate this geometry in a top view and side view, respectively. As shown, reference numeral 1 denotes an ultrathin single-mode waveguide, reference numeral 2 denotes a mode field size conversion region, reference numeral 3 denotes an auxiliary waveguide section, and reference numeral 4 denotes a nanotaper. Within mode field size conversion region 2, nanotaper 4 has a lateral dimension that starts at a relatively small value at tip 5 (often 50–150 nm), and then tapers outward to the final desired waveguide dimensions associated with ultrathin waveguide section 1. The thickness of nanotaper 4 remains relatively constant along mode field size conversion region 2.

The mode size associated with tip 5 of the nanotaper 4 is "large" (due to the weak confinement of the light) and shrinks as nanotaper 4 expands in size, providing tighter confinement of the light as the effective refractive index increases along the length of the nanotaper. This effect facilitates the required mode conversion into the smaller mode associated with ultrathin single-mode waveguide 1. As shown, light is launched into an endface 6 of auxiliary waveguide section 3 (perhaps from an optical fiber—not shown), where it propagates along unimpeded until it encounters tip 5 of nanotaper 4 in mode conversion region 2. At this point, the light beam is transferred from the relatively low effective index layer 7 of auxiliary waveguide section 3 to the relatively high effective index ultrathin waveguide 1 with low loss, since the mode size is gradually reduced along the extent of the taper.

While these and other prior art nanotaper couplers have been successful in bringing light from an optical fiber into an ultrathin single-mode waveguide, there are limitations in how they may be employed. Perhaps the greatest hindrance in utilizing the prior art nanotaper couplers is the "end fire" coupling requirement; that is, an optical fiber (or other waveguide) must provide a signal that couples through a sidewall (endface) of an optical substrate and into the nanotaper. Such a coupling arrangement requires careful preparation of the sidewall surface in terms of cleaving and polishing (to reduce scattering losses), followed by the application of a anti-reflective (AR) coating. All of these preparation activities are expensive and time-consuming. A larger problem associated with the "end fire" coupling is the fact that only the edge of the substrate may be used for coupling; the remainder of the wafer surface is unavailable for use with a conventional nanotaper coupler.

Additionally, the larger auxiliary waveguide section often requires the use of material several microns thick (in order to establish a low-loss interface to the fiber), where these dimensions are not compatible with conventional CMOS processing techniques.

Thus, a need remains in the art for the development of a silicon nanotaper coupler that is more robust and can be used as a coupling device at virtually any location across a wafer surface.

SUMMARY OF THE INVENTION

The need remaining in the prior art is addressed by the present invention, which relates to silicon-based nanotaper couplers and, more particularly, to nanotaper couplers that may be utilized in conjunction with free-space optical couplers to facilitate the coupling of optical signals into and out of ultrathin, single-mode silicon waveguides.

In accordance with the present invention, a "nanotaper coupler" refers to a coupling arrangement that comprises a silicon nanotaper in combination with a thin dielectric coupling waveguide having a core refractive index that is greater than that of an associated cladding material, but less than the refractive index of silicon. As before, the silicon nanotaper is disposed in an overlapping relationship with the dielectric waveguide (which serves as the auxiliary waveguide) so as to provide for mode conversion and coupling of the propagating signal into an associated ultrathin silicon waveguide. A free-space coupling device, such as a prism coupler or grating structure, is used in accordance with the present invention to couple a free space optical signal into the thin dielectric coupling waveguide through the waveguide surface. Thus, the need for "end-fire" coupling arrangements, as required in the prior art, is eliminated.

Moreover, by using a free-space coupling device (e.g., prism coupler or grating), the constraints on the thicknesses and refractive indexes of the materials comprising the dielectric waveguide in prior art nanotaper couplers are greatly relaxed. Free-space coupling devices couple light efficiently into thin layers of material and can accommodate a range of refractive index values. Thus, the dimensions of the dielectric waveguide can be reduced to values that are compatible with semiconductor processing if a suitable high refractive index material is available to comprise the dielectric waveguide core. Silicon nitride (n≈2) is one exemplary dielectric that may be used in implementing the invention.

It is an advantage of the present invention that the utilization of a thin dielectric coupling waveguide with a core refractive index less than silicon allows for various adjustments to be made in the free-space coupling arrangement to provide for improved efficiency. For example, the thickness of the dielectric layer may be controlled by conventional CMOS fabrication processes to provide the optimum thickness required for coupling (as a function of the specific dielectric material selected).

In a preferred embodiment of the present invention, focusing optics are included within the dielectric coupling waveguide to reduce the lateral dimension of the in-coupled optical beam as it approaches the entrance of the silicon nanotaper. The dielectric coupling waveguide may itself include a tapered profile in the lateral dimension to reduce reflections at the interface with the nanotaper.

The utilization of a material other than silicon for the dielectric coupling waveguide allows for materials other than silicon to also be used to form the associated free-space optical coupler, providing for some relaxation on the geometry of the launch conditions required for coupling a light beam into and out of a surface waveguide layer.

It is an aspect of the present invention that the dielectric coupling waveguide in conjunction with a silicon nanotaper may be used to provide coupling into and out of ultrathin silicon waveguides at any location on an opto-electronic structure (not limited, that is, for use as an input/output coupler). In this case, the dielectric coupling waveguide can be used to form various optical devices (passive devices) that are not compatible with the properties of ultrathin waveguides (scattering loss problems, for example), reserving the use of the ultrathin waveguides for high-performance active optical devices.

Other and further embodiments and aspects of the present invention will become apparent during the course of the following discussion, and by reference to the accompanying drawings.

BRIEF DESCRIPTION OF THE DRAWINGS

Referring now to the drawings.

DETAILED DESCRIPTION

Figure 1:
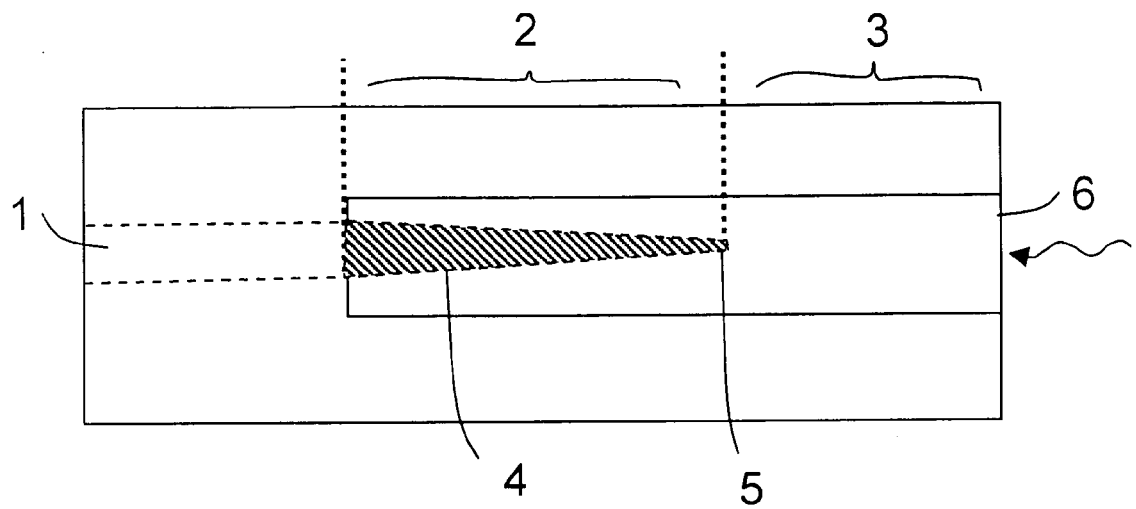
FIGS. 1 and 2 illustrate an exemplary prior art nanotaper coupling arrangement.
Figure 2:
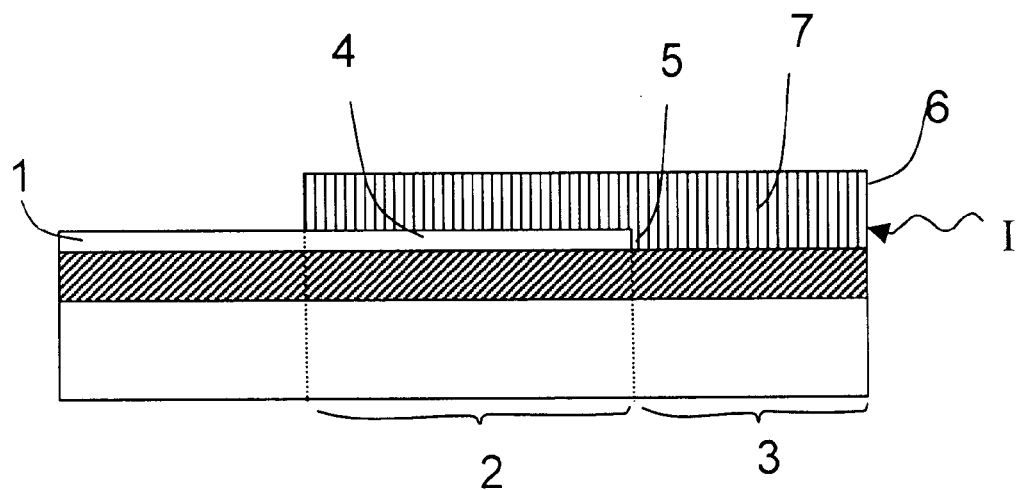
Figure 3:
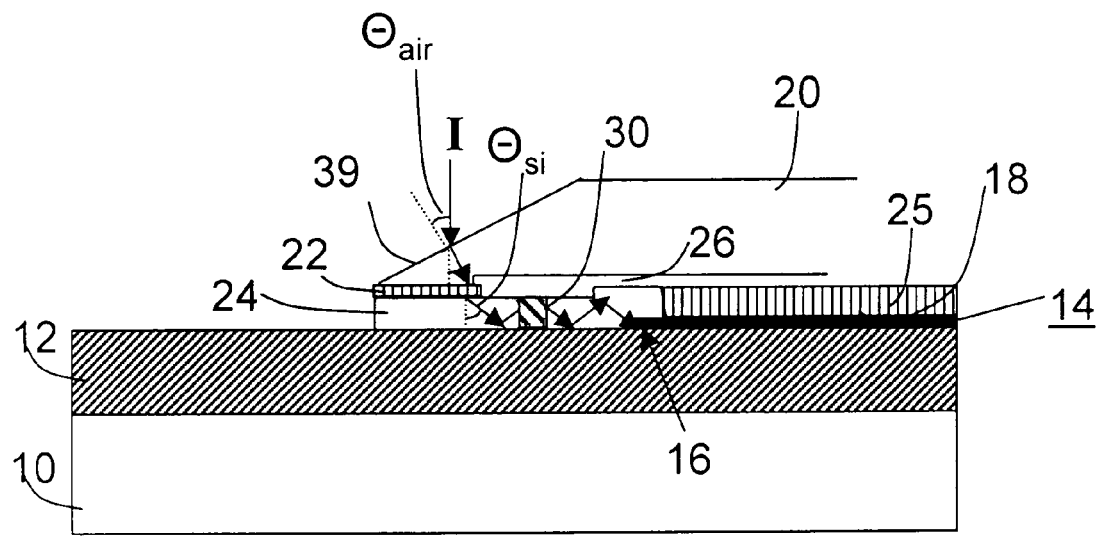
FIG. 3 contains a side view of an SOI-based exemplary hybrid coupler formed in accordance with the present invention.

The utilization of a hybrid coupling arrangement comprising a silicon-based nanotaper coupler and free-space optical coupler, in accordance with the present invention, addresses many of the problems associated with the prior art end-fire couplers and offers additional flexibility with respect to wafer-scale fabrication and free-space optical coupling. FIG. 3 contains a side view, and FIG. 4 a top view, of an SOI-based exemplary hybrid coupler formed in accordance with the present invention. In most cases, the devices formed in accordance with the present invention will comprise an SOI structure including a silicon substrate 10, a silicon dioxide insulating layer 12 and an upper silicon device layer (hereinafter referred to as an "SOI layer") 14, where SOI layer 14 generally comprises a thickness of less than one micron.

Figure 4:
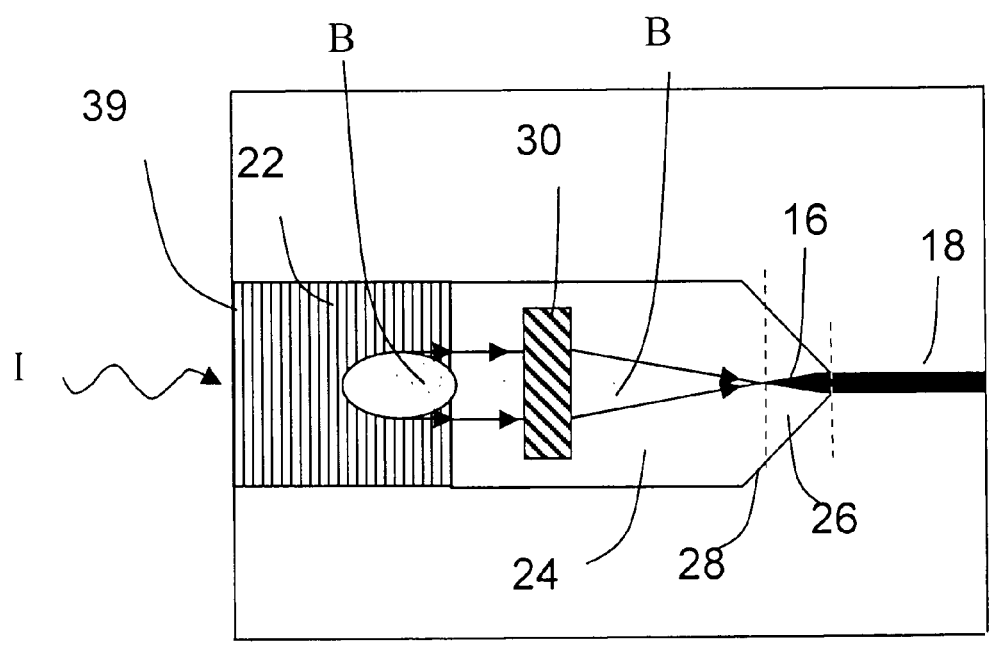
FIG. 4 contains a top view of an SOI-based exemplary hybrid coupler formed in accordance with the present invention.

A silicon nanotaper 16 (best illustrated in FIG. 4) is formed within a portion of SOI layer 14 and used, as discussed above, to provide efficient coupling into an ultrathin silicon strip waveguide 18 also formed within SOI layer 14. In accordance with the present invention, various limitations associated with prior art end-fire nanotaper coupling arrangements are overcome by including a free-space optical coupling element with the SOI-based structure. In the exemplary embodiment as illustrated in FIGS. 3 and 4, a prism coupler 20 and associated evanescent coupling layer 22 are used to couple a free-space optical beam into a dielectric waveguide coupling layer 24, with light propagating in dielectric waveguide 24 until it reaches silicon nanotaper 16, where the light is then transferred to ultrathin silicon waveguide 18. Alternatively, as discussed in further detail below, a grating structure may be used as a free-space optical coupler to guide a propagating optical signal into dielectric waveguide coupling layer 24.

In accordance with the present invention, relatively thin dielectric coupling layer 24 is included in the inventive arrangement and used to couple the incoming light I from prism coupler 20 into silicon nanotaper 16, where the refractive index of layer 24 is selected to be greater than that of evanescent coupling layer 22 and insulating layer 12, yet less than that of silicon. In one embodiment, silicon dioxide (n=1.45) may be used to form evanescent coupling layer 22 (as well as insulating layer 12). In this case, silicon nitride (n approximately 2) may be used to form dielectric coupling layer 24, where silicon nitride is a common material used in CMOS processing and can easily be deposited, patterned and etched to exhibit the desired dimensions.

In order to provide the desired light coupling into nanotaper 16, an end portion of dielectric coupling layer 24 is disposed to overlap a predetermined terminal portion of nanotaper 16 within a mode field size conversion section 26. Preferably, dielectric coupling layer 24 is formed to include a tapered profile in the lateral direction as it nears nanotaper 16 (illustrated by reference numeral 28 in FIG. 4) so as to reduce reflection losses at the interface between dielectric coupling layer 24 and an upper cladding layer 25 of the silicon strip waveguide (shown in FIG. 3). As will be described in detail hereinbelow, a focusing element 30 is formed within dielectric coupling layer 24 and used to facilitate the focusing of the incoming beam into the spot size appropriate for nanotaper 16. Focusing element 30 may take the form of a lens, a mirror or an adiabatic coupling arrangement to form a mode-preserving coupler.

In operation, an incoming free-space optical signal I impinges on an input facet 39 of prism coupler 20, and then passes through evanescent coupling layer 22 to be coupled into a slab mode of dielectric coupling layer 24. The outline of the propagating optical beam B is illustrated in FIG. 4. Advantageously, the use of such a coupling arrangement allows for the beam to enter a wafer surface at virtually any desired location, as long as a prism coupler (or other free-space optical coupling device) and evanescent coupling region are present. Additionally, the use of a dielectric coupling layer 24 (such as silicon nitride) reduces past limitations associated with the use of a silicon material (in particular, SOI layer 14) as this coupling element. Moreover, the use of an alternative material for this dielectric coupling layer opens up many other materials options for prism coupler 20.

Indeed, an advantage of utilizing a separate dielectric coupling layer 24 in place of SOI layer 14 in the input coupling region is that the refractive index of this input coupling region can now be modified as need be. In most cases in the prior art, SOI layer 14 is utilized to not only to couple into the SOI structure, but to form other components within the opto-electronic system. These additional requirements of the SOI layer controls both the doping and thickness of SOI layer 14 for both optical and electrical considerations, thus not allowing the parameters of the SOI layer 14 to be modified for optimum coupling performance. This constraint, in turn, places significant constraints on the geometry of the launch conditions for the input (as well as output) beam.

Therefore, by virtue of processing SOI layer 14 to eliminate a portion of the layer and replace it with the dielectric waveguide coupling material such as silicon nitride, the thickness of this deposited silicon nitride layer may be controlled (using standard CMOS processes) so that the final dielectric region exhibits the precise dimensions required for efficient optical coupling. In one embodiment, the thickness of dielectric coupling layer 24 may be less than 0.5 $\mu$m, with insulating layer 12 having a thickness on the order of 1.0 $\mu$m.

In prior arrangements, where a silicon waveguiding region (usually, the SOI layer) was utilized to couple a free space beam into an SOI structure, the associated prism coupler was also formed, of necessity, from silicon. Now, with the use of a different dielectric material for the waveguiding coupling region (with a lower refractive index than silicon), many other materials and/or arrangements may be used to form the prism coupler. The ability to select a different material is also considered to somewhat "relax" the stringent requirements on the input beam coupling angle (with respect to input facet 32), the thickness/properties of evanescent coupling layer 22, etc.

Figure 5:
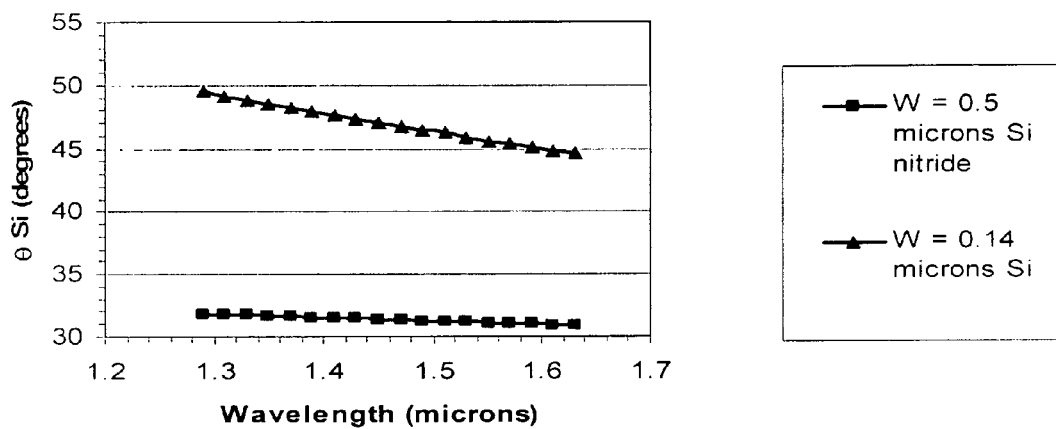
FIG. 5 contain plots illustrating the wavelength dependence associated with $\theta_{Si}$, the beam angle inside an exemplary prism coupler.
Figure 6:
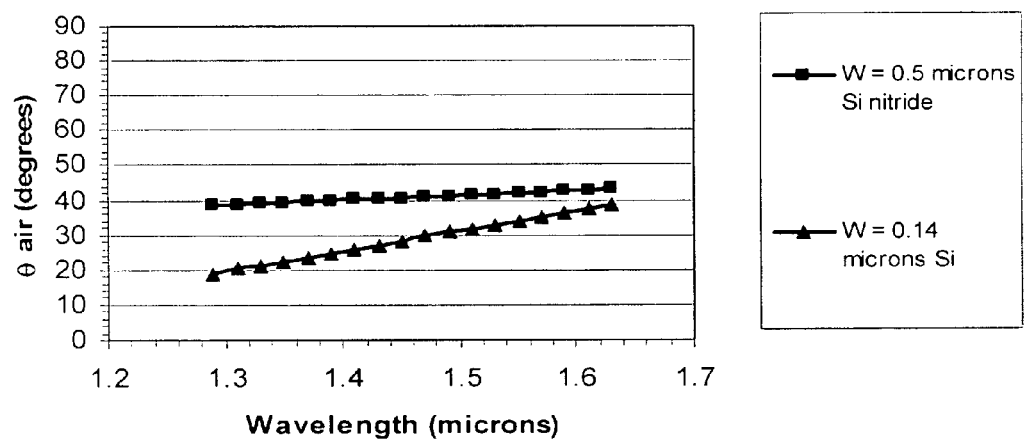
FIG. 6 contains plots illustrating the wavelength dependence associated with $\theta_{air}$, the beam launch angle into an exemplary prism coupler.

An additional advantage is found by using silicon nitride in place of silicon as the coupling waveguide. Indeed, when using silicon nitride, the light launch condition has been found to be less sensitive to wavelength, allowing for the inventive coupling arrangement to be used over a broader wavelength range. FIGS. 5 and 6 contain plots illustrating this aspect of the present invention for $\theta_{Si}$ (the beam angle inside prism 20—see FIG. 3) and $\theta_{air}$ (the beam launch angle into prism 20—see FIG. 3), respectively. Referring to FIG. 5, a comparison between using a silicon nitride waveguide coupling layer to a prior art silicon coupling layer is shown. As is obvious from the results, there is very little change in the optimum value for $\theta_{Si}$ as the input wavelength is varied over the range of 1.3–1.65 $\mu$m when using a silicon nitride coupling waveguide—allowing a single device to efficiently coupling multiple wavelengths (especially useful in WDM applications). In contrast, the prior art arrangement shows a variation of more than 5° over this same wavelength range. A similar result is illustrated in the graph of FIG. 6, where the prior art change in $\theta_{air}$ is shown as varying from less than 20° to almost 40° over the wavelength range of interest. When using a silicon nitride coupling waveguide, in accordance with the present invention, this angle dependence is reduced to a value of no more than 5° over the same bandwidth.

In order to prevent having optical signal loss through light "leaking" from dielectric coupling layer 24 into underlying dielectric layer 12 and substrate 10, tight confinement of the optical signal within dielectric coupling layer 24 is required. Therefore, the refractive index of dielectric coupling layer 24 must significantly exceed that of a standard cladding material (e.g., silicon dioxide with n=1.45). As mentioned above, silicon nitride, with a refractive index of approximately 2, is an exemplary relatively high refractive index material that can be used for this purpose. Other materials, such as a doped silicon dioxide, silicon oxynitride and silicon carbide may also be used.

While the effective thickness of dielectric coupling layer 24 is typically less than one micron, the beam diameter (as shown by the optical mode profile O) may be on the order of tens of microns. In order to provide efficient coupling of the beam into the ultrathin silicon waveguide (on the order of one micron, or less), the lateral dimension of the beam needs to be reduced to that of the waveguide. Using a prior art nanotaper arrangement to provide the desired coupling power would require the nanotaper to have a length inappropriate for use in SOI-based opto-electronic devices, where space comes at a premium. Therefore, additional focusing optics 30 are used in the inventive arrangement, disposed along dielectric coupling layer 24, to reduce the lateral dimension of the optical mode O prior to the beam entering mode conversion region 26 defined by the overlap of dielectric coupling layer 24 and nanotaper 16. It is to be understood that various other arrangements may be used to provide the desired lateral confinement. For example, a photonic bandgap (PBG) structure may also be formed along a portion of dielectric coupling layer 24 and provide the desired confinement at the interface with mode conversion region 26. An adiabatically tapered structure may also be used.

Figure 7:
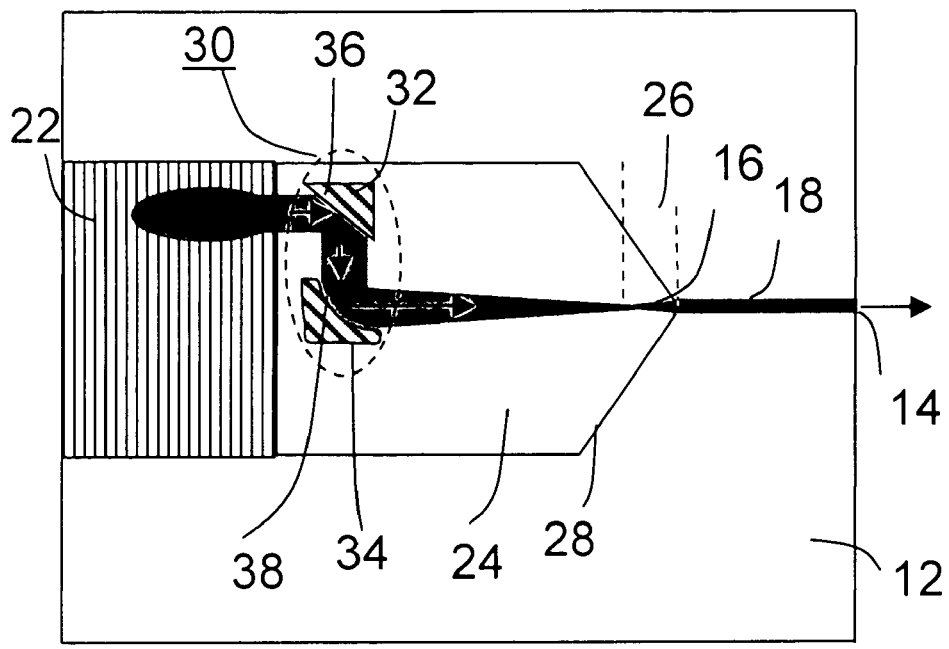
FIG. 7 contains a top view of one exemplary arrangement where focusing optics is included in the inventive arrangement.

Various types of focusing arrangements can be used to provide the desired beam shaping in the mode conversion region. FIG. 7 contains a top view of one exemplary arrangement where focusing optics 30 is shown as comprising a turning mirror 32 and a focusing mirror 34, disposed as shown along the beam path within dielectric coupling layer 24. Advantageously, these waveguide mirrors may be easily formed in dielectric coupling layer 24 utilizing conventional CMOS fabrication techniques. In the case where dielectric coupling layer 24 comprises a layer of silicon nitride, turning mirror 32 and focusing mirror 34 may comprise silicon dioxide. As a result of the difference in refractive index between these two materials, essentially all of the impinging light beam will be reflected off of the encountered surfaces. Therefore, the propagating optical signal will first reflect off of surface 36 of turning mirror 32 and be directed to surface 38 of focusing mirror 34. The focusing provided by focusing mirror 34, as shown in FIG. 7, results in significantly reducing the lateral dimension of the beam as it enters mode conversion region 26, and ultimately into nanotaper 16.

In an alternative embodiment (not shown), a convex waveguide lens can be fabricated within dielectric coupling layer 24. In this case, dielectric coupling slab layer 24 may comprise silicon nitride, while the lens element is formed of an oxide material.

It is well-known that the narrow, ultrathin silicon waveguides (also referred to as "silicon wires") have exceedingly small dimensions, on the order of 0.2 $\mu$m×0.5 $\mu$m and tend to be somewhat lossier than their dielectric counterparts. The increased optical loss can be attributed to factors such as the high index contrast, sidewall roughness, doping requirements, etc. For very low loss applications, or applications that require long optical path lengths to increase device sensitivity (such as sensors, for example), the loss associated with a silicon wire waveguide is prohibitively high. Thus, in accordance with the teachings of the present invention, the combination of a dielectric coupling layer 24 with a silicon nanotaper 16 can be used to intentionally locate various optical devices within either dielectric coupling layer 24 or silicon wire 18. Indeed, a number of passive optical devices (such as, for example, lenses, mirrors, filters, gratings, etc.) may be formed within dielectric coupling layer 24, since layer 24 exhibits larger dimensions (with less loss), allowing for relatively long waveguide path lengths to be used. Silicon wire 18 may be "saved", therefore, for use with only the critical active optical devices.

Figure 8:
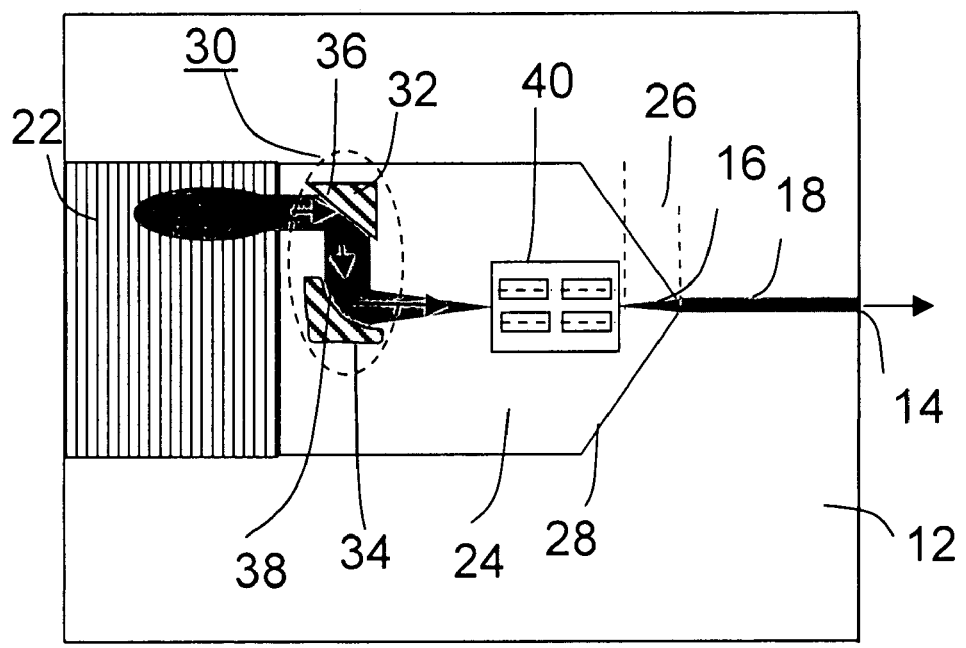
FIG. 8 illustrates, in a top view, an alternative embodiment of the present invention, incorporating passive optics into the dielectric waveguide layer.
Figure 9:
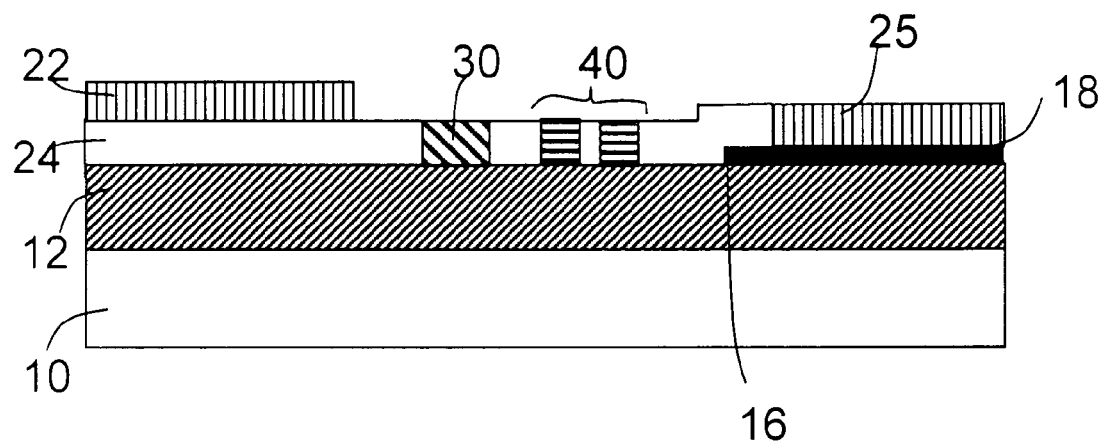
FIG. 9 is a side view of the arrangement illustrated in FIG. 8.
Figure 10:
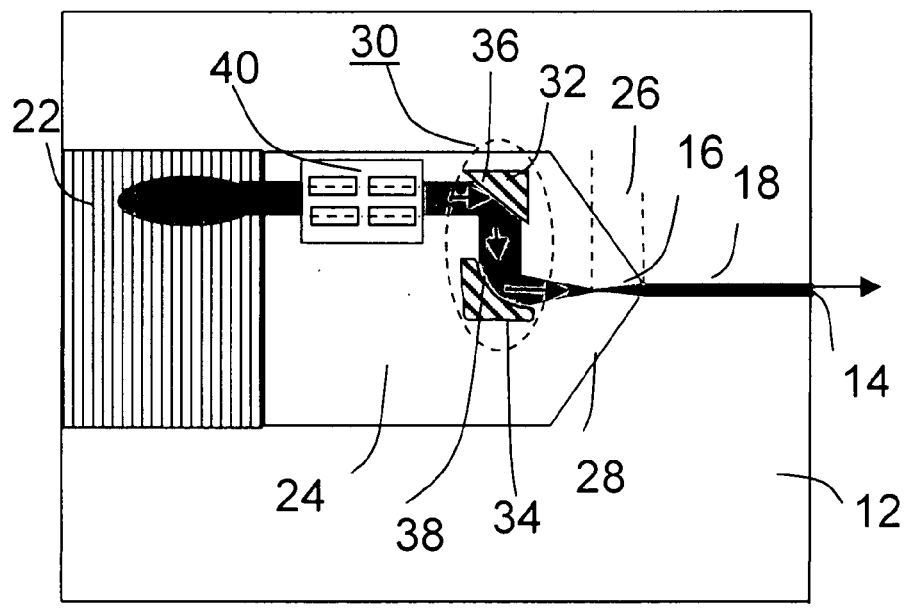
FIG. 10 is a top view of an alternative arrangement for including passive optics in the arrangement of the present invention.

FIG. 8 contains a top view of an exemplary arrangement for incorporating a plurality of passive optical devices 40 into dielectric coupling layer 24, with a partial side view (without the associated coupling optics) in FIG. 9. The specific number and type(s) of passive optical devices are not shown in FIGS. 8 and 9. An alternative embodiment is illustrated (in a top view) in FIG. 10, where turning mirror 32 and focusing mirror 34 are disposed at the output of the plurality of optical devices 40, so as to focus the output from focusing mirror 34 directly into mode conversion region 26.

Indeed, this specific aspect of the present invention may be implemented at various locations within an SOI structure and need not be associated with the activities of coupling light into and out of the SOI layer itself. That is, a combination of dielectric coupling layer 24 and nanotaper 16 may be judiciously used at various locations where both passive and active optical structures are required, with the passive devices formed in dielectric coupling layer 24, and nanotaper 16 used to efficiently couple the light from the passive components into one or more active devices formed in silicon wire 18. A similar taper can then be used, transfer the light energy from a silicon wire back into another dielectric waveguide.

Figure 11:
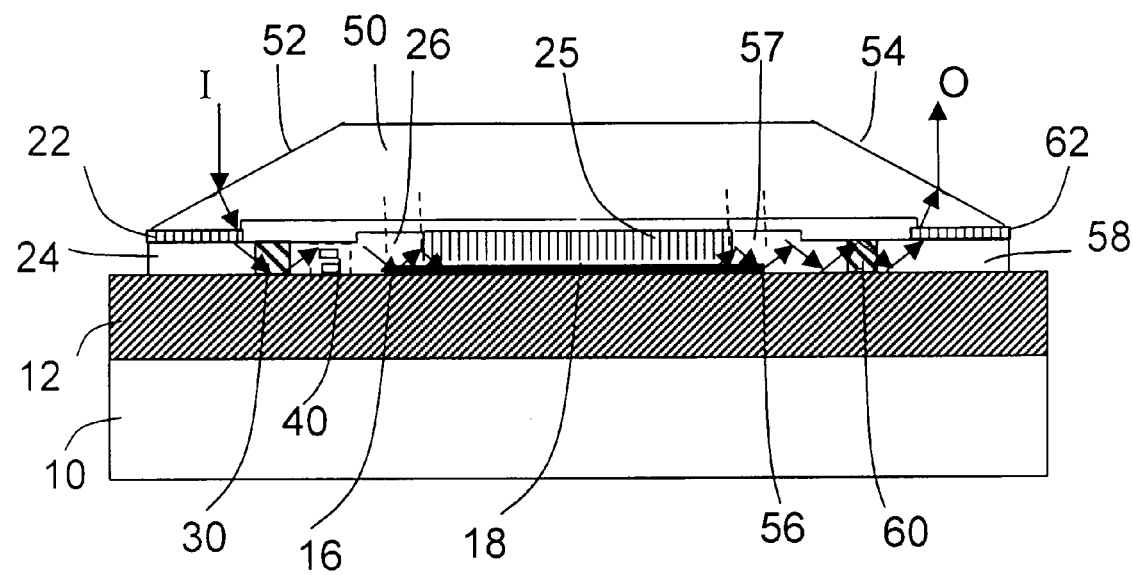
FIG. 11 illustrates an arrangement including both an input coupler and output coupler, in this case a trapezoidal prism coupler, formed in accordance with the present invention.

As mentioned above, the hybrid free-space/nanotaper coupling arrangement of the present invention is equally applicable to improve the out-coupling from ultrathin silicon waveguide region through a coupler and back into free space. FIG. 11 illustrates an arrangement including both an input coupler and output coupler, in this case a trapezoidal prism coupler 50. Referring to FIG. 11, trapezoidal prism coupler 50 is illustrated as including an input facet 52 and an output facet 54 (with an input beam "I" shown as impinging input facet 52, and an output beam "O" shown as exiting along output facet 54).

As described above, input beam I will propagate through prism coupler 50 and then enter evanescent coupling layer 22 (where evanescent coupling layer 22 generally comprises silicon dioxide). The optical beam is thereafter coupled into dielectric coupling layer 24 (formed of an appropriate thickness), where the signal then encounters passive optical devices including at least focusing optics 30 and, possibly a plurality of passive optical devices 40. Mode conversion region 26 defines the overlap between dielectric coupling layer 24 and nanotaper 16. As shown, the optical signal will go through a mode conversion, propagate along nanotaper 16 and ultimately be coupled into ultrathin ("silicon wire") waveguide 18. Clearly shown in the embodiment of FIG. 11 is the location of upper cladding layer 25 (usually comprising silicon dioxide) with respect to ultrathin waveguide 18, which in combination with dielectric layer lower cladding layer 12 will confine the propagating optical signal within ultrathin waveguide 18.

Figure 12:
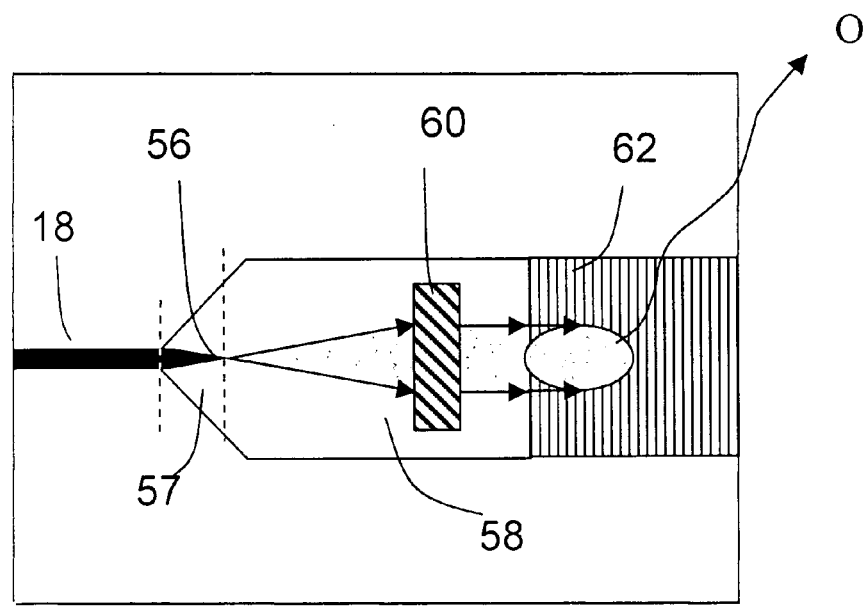
FIG. 12 is a top view of an exemplary out-coupling arrangement for use in the structure of FIG. 11.

A second silicon nanotaper 56, also referred to as "exit" nanotaper, is illustrated in FIG. 11 as disposed at the termination of ultrathin waveguide 18. In this case, the lateral dimension of exit nanotaper 56 is shown as narrowing as it nears output coupling facet 54. This aspect is best illustrated in FIG. 12. A dielectric coupling waveguide 58 is illustrated in FIGS. 11 and 12 as disposed so as to overlap the terminal portion of exit nanotaper 56 to form a mode conversion region 57 and allow the propagating signal to expand into dielectric coupling waveguide 58. Passive optical devices 60 are illustrated as formed within dielectric coupling waveguide 58 including, at the least, a collimating mirror (not shown) to properly redirect the propagating signal into an exit evanescent coupling layer 62, through coupling prism 50 and exiting through output facet 54.

Figure 13:
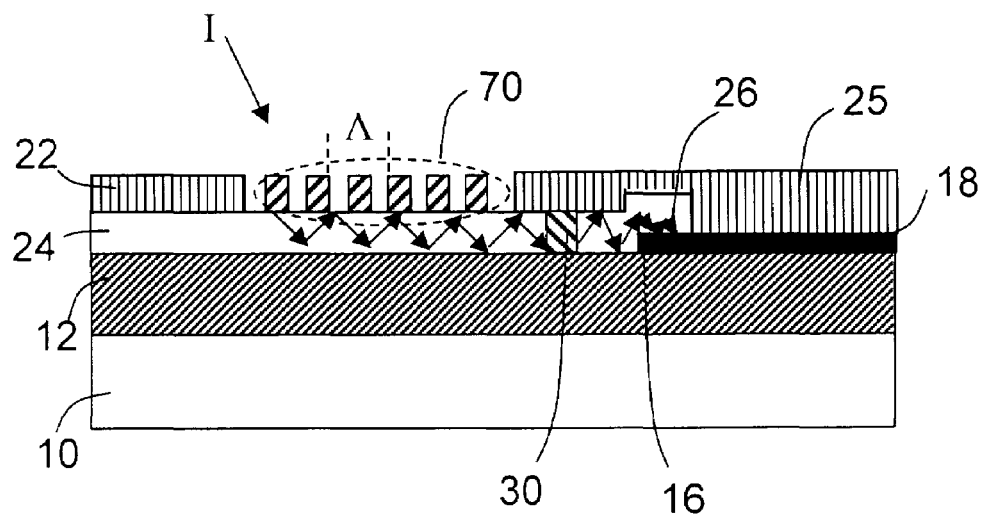
FIG. 13 illustrates an alternative embodiment of the present invention, using a grating as a free-space optical coupling arrangement.
Figure 14:
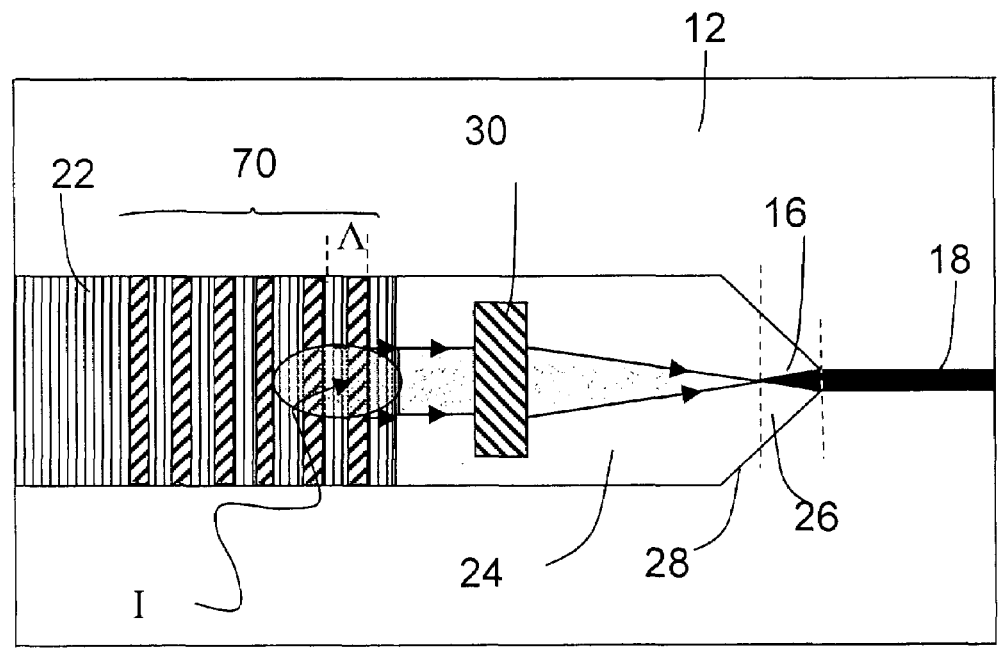
FIG. 14 is a top view of the embodiment of FIG. 13.

While the above-described embodiments of the coupling aspect of the present invention utilized a prism coupler to bring a free-space optical signal into the SOI layer (and also launch a surface-propagating beam back into free space), various other free space coupling arrangements may be utilized in conjunction with the dielectric waveguide/nanotaper arrangement of the present invention. FIGS. 13 and 14 illustrate one specific alternative, utilizing a grating structure 70 instead of prism coupler 20 (or 50). FIG. 13 contains a side view and FIG. 14 a top view of this particular embodiment. As shown, a grating 70 is formed in evanescent coupling layer 22 (and/or possibly dielectric layer 24) to couple free-space optical signal I into dielectric coupling layer 24. In this case, the period of grating 70 (denoted "Λ" in FIGS. 13 and 14) is determined, in conjunction with the properties of dielectric coupling waveguide 24, to provide the most efficient coupling arrangement. It is an advantage of the arrangement of the present invention that the properties of dielectric coupling waveguide 24 can be adjusted during fabrication (e.g., including of dopants during fabrication, control of thickness, etc.) so that such a grating will provide a sufficient amount of coupling. Although not illustrated specifically in FIGS. 13 and 14, it is obvious that a similar arrangement may be used as an output coupler, as discussed above in association with FIGS. 11 and 12.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the invention as defined by the following claims.

What is claimed is:

1. An arrangement for providing optical coupling between a free-space propagating optical signal and an ultrathin silicon waveguide formed in an upper silicon layer of a silicon-on-insulator (SOI) structure, the SOI structure further comprising:
    a silicon nanotaper structure formed in the upper silicon layer (SOI layer) of the SOI structure, the silicon nanotaper having a first, narrow endface and a second, larger endface with a laterally extending tapered structure therebetween, the second, larger endface coupled to the ultrathin silicon waveguide to provide optical coupling therebetween;
    a dielectric waveguide coupling layer having a top major surface, with a refractive index greater than the index of the dielectric insulating layer but less than the refractive index of silicon, disposed so as to overly a portion of the dielectric insulating layer in a region where an associated portion of the SOI layer has been removed and optical coupling into the remaining portion of the SOI layer is desired, with an end portion of the dielectric waveguide coupling layer overlapping an end section of the silicon nanotaper including the first, narrow endface to form a mode conversion region between the free-space propagating optical signal and the ultrathin silicon waveguide; and
    a free-space optical coupling arrangement disposed over the top major surface of the dielectric waveguide coupling layer so as to couple the propagating optical signal between free space and the dielectric waveguide coupling layer and thereafter into the ultrathin silicon waveguide.

2. An arrangement as defined in claim 1 wherein the free-space optical coupling arrangement includes an evanescent coupling layer disposed over at least a portion of the dielectric waveguide coupling layer.

3. An arrangement as defined in claim 2 wherein the free-space optical coupling arrangement further comprises an optical prism coupler disposed over the evanescent coupling layer so as to couple a free space signal into and out of the underlying dielectric waveguide coupling layer.

4. An arrangement as defined in claim 3 wherein the optical prism coupler comprises silicon.

5. An arrangement as defined in claim 3 wherein the optical prism coupler comprises a dielectric material with a refractive index at least equal to the refractive index of the dielectric waveguide coupling layer.

6. An arrangement as defined in claim 1 wherein the dielectric waveguide coupling layer further comprises focusing optics to more narrowly confine the lateral boundaries of a propagating optical signal as the propagating optical signal enters the mode conversion region.

7. An arrangement as defined in claim 6 wherein the focusing optics comprises at least one waveguide mirror formed by disposing properly patterned regions of silicon dioxide into the dielectric waveguide coupling layer.

8. An arrangement as defined in claim 1 wherein the dielectric waveguide coupling layer further comprises at least one passive optical component disposed at a location separate from the mode conversion region.

9. An arrangement as defined in claim 1 wherein the free-space optical coupling arrangement comprises a coupling grating disposed on the surface of the SOI structure.

10. An arrangement as defined in claim 9 wherein the arrangement further comprises an evanescent coupling layer formed over a portion of the dielectric waveguide coupling layer.

11. An arrangement as defined in claim 1 wherein the dielectric waveguide coupling layer comprises a layer of material selected from the group consisting of doped silicon dioxide, silicon nitride, silicon carbide and silicon oxynitride.

12. An arrangement as defined in claim 1 wherein the dielectric waveguide coupling layer exhibits a tapered lateral profile so as to taper inward toward the mode conversion region and reduce optical reflections.

* * * * *